(12) United States Patent
Jain

(10) Patent No.: US 7,925,590 B2
(45) Date of Patent: Apr. 12, 2011

(54) MULTIMEDIA SEARCH ENGINE

(75) Inventor: Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/141,615

(22) Filed: Jun. 18, 2008

(65) Prior Publication Data

US 2009/0319370 A1 Dec. 24, 2009

(51) Int. Cl.
*G06F 21/00* (2006.01)
*H04N 7/167* (2006.01)

(52) U.S. Cl. .......................................... 705/57; 380/201

(58) Field of Classification Search ................. 705/1–45, 705/50, 79
See application file for complete search history.

(56) References Cited

U.S. PATENT DOCUMENTS

| | | | | |
|---|---|---|---|---|
| 5,918,213 A * | 6/1999 | Bernard et al. | ................ | 705/26 |
| 5,963,916 A * | 10/1999 | Kaplan | ........................... | 705/26 |
| 6,674,452 B1 | 1/2004 | Kraft et al. | | |
| 2001/0018858 A1 | 9/2001 | Dwek | | |
| 2002/0002899 A1 | 1/2002 | Gjerdingen et al. | | |
| 2002/0116360 A1 | 8/2002 | Oh et al. | | |
| 2005/0038819 A1 | 2/2005 | Hicken | | |
| 2005/0203849 A1 | 9/2005 | Benson | | |
| 2006/0206580 A1* | 9/2006 | Johnson, III | ................ | 709/217 |
| 2006/0253436 A1* | 11/2006 | Cook et al. | ......................... | 707/3 |
| 2007/0083441 A1* | 4/2007 | Harper et al. | .................... | 705/26 |
| 2007/0130015 A1 | 6/2007 | Starr et al. | | |
| 2007/0255965 A1* | 11/2007 | McGucken | ................... | 713/193 |
| 2007/0282860 A1 | 12/2007 | Athineos et al. | | |
| 2008/0015953 A1* | 1/2008 | Harper et al. | ................... | 705/27 |
| 2008/0046312 A1 | 2/2008 | Shany et al. | | |

OTHER PUBLICATIONS

Adewumi, David, "38 free/cheap music sites—Welcome to the fray, Qbox!", Date: Jan. 23, 2008, 23 Pages http://venturebeat.com/2008/01/23/38-freecheap-music-sites-welcome-to-the-fray-qbox/.

"Amp'd Mobile Partners with Medio Systems to Launch Innovative and Enhanced Search and Advertising", Date: Feb 5, 2007, 1 Page. http://medio.com/news/ampd_mobile_partners_with_medio_systems_to_launch_innovative_and_enhanced_s/.

Herzelia, "Music Industry Giant Select Targetize Mobile Search and Discovery Solution", Date: Jul. 26, 3 Pages http://www.prnewswire.co.uk/cgi/news/release?id=175989.

* cited by examiner

*Primary Examiner* — Andrew J. Fischer
*Assistant Examiner* — Murali Dega

(57) ABSTRACT

Described herein is a search engine that can include a receiver component that receives a query from a user that pertains to a multimedia item and an output component that outputs multiple choices for receiving an instance of the multimedia item to a user. The multiple choices may include a first choice for receiving a first instance of the multimedia item for no charge, wherein the first instance of the multimedia item includes a digital rights management restriction. The multiple choices may also include a second choice for receiving a second instance of the multimedia item for a fee, wherein the second instance of the multimedia item is free of digital rights management restrictions. The search engine can further include a transmitter component that transmits one of the first multimedia item or the second multimedia item to the user.

20 Claims, 12 Drawing Sheets

MULTIMEDIA SEARCH ENGINE

BACKGROUND

Recent advancements in computers and networking have revolutionized the entertainment field in general, and the music industry in particular. For instance, in the past, to purchase a song or album, an individual had to travel to a retail store and purchase a vinyl record therefrom. To listen to the song or album, the individual had to be in their home or at another location that included a record player. As time passed, vinyl records were replaced by audio tapes, which are more portable. Recordable audio tapes can be used to replicate audio that is on a purchased audio tape that includes content that is subject to copyright protection. Sound quality, however, often diminishes when content of a first audio tape is recorded onto a second audio tape.

As time passed, compact disks replaced audio tapes, wherein compact disks are computer-readable mediums that include digital audio content. As technology advanced, users have been able to create perfect copies of compact disks through utilization of compact disk burners. Furthermore, content that is subject to copyright protection can be retained on a computer storage device where, for instance, a single song uses a very small amount of available data storage. Thus, an individual can retain thousands of songs on a personal computer, a portable media player, and/or the like. Furthermore, individuals can transfer digital content amongst one another in a matter of seconds or less. The music industry has estimated billions of dollars in loss due to copyright infringement and file sharing.

In an attempt to curb copyright infringement and to gain revenue from the sale of multimedia by way of the Internet, songs and/or albums can be purchased online. These songs and/or often are packaged with digital rights management (DRM) restrictions. For instance, a DRM restriction may restrict a device that can be used to play the song, may restrict a number of times that the song can be played, may restrict copying of the song, amongst other restrictions.

SUMMARY

The following is a brief summary of subject matter that is described in greater detail herein. This summary is not intended to be limiting as to the scope of the claims.

Described herein are various technologies pertaining to distribution of multimedia. More particularly, a search engine that can provide a user with a multimedia item (e.g., a song) at no cost to the user is described herein. A search engine described herein can receive a query pertaining to a multimedia item, such as a song, a movie, a television program, or other suitable multimedia item. Based at least in part upon the query, the search engine can output multiple choices to the user, wherein the user can select one of the choices to obtain an instance of the multimedia item. More specifically, the multiple choices can include a first choice and a second choice. If the user selects the first choice, a first instance of the multimedia item can be transmitted to the user, wherein the first instance is free of charge and is subject to at least one digital rights management restriction. If the user selects the second choice, a second instance of the multimedia item can be transmitted to the user, wherein the second instance is free of digital rights management restrictions and is associated with a fee. In other words, the user can pay for the second instance of the multimedia item.

Payment can be allocated to an owner of copyright rights of the multimedia item regardless of whether the first choice or the second choice is selected. For instance, payment can be provided to the American Society of Composer, Authors, and Publishers if a user obtains an instance of the multimedia item by way of the search engine.

Furthermore, advertisements can be presented to users that search for multimedia items by way of the search engine. For example, revenue generated by way of advertisements can be used to support provision of instances of multimedia items to users of the search engine. An advertisement provided to a user may be based at least in part upon a query proffered by the user, previous online activity of the user, and/or the like.

Other aspects will be appreciated upon reading and understanding the attached figures and description.

DETAILED DESCRIPTION

Figure 1:
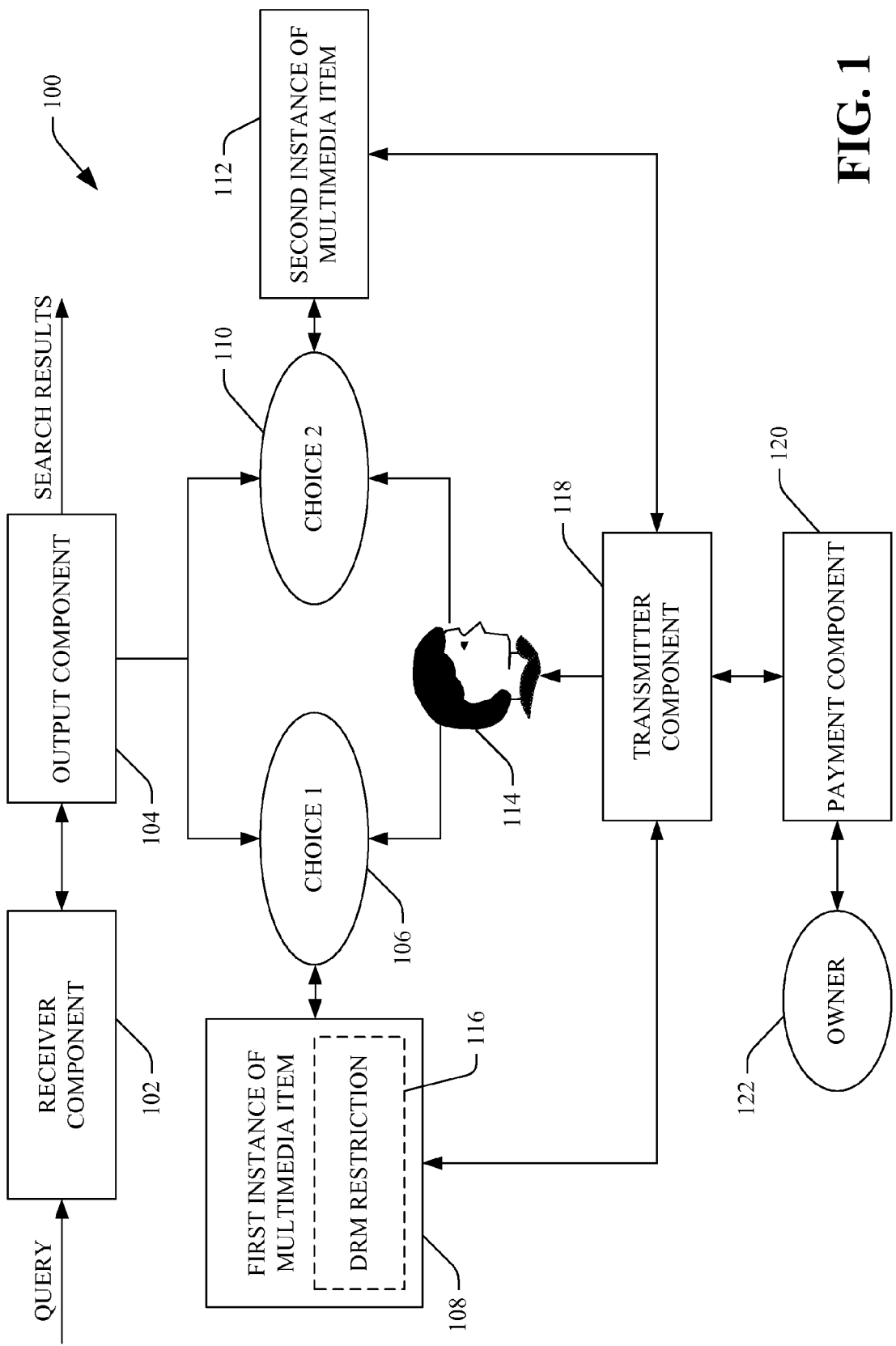
FIG. 1 is a functional block diagram of an example system that facilitates transmitting an instance of a multimedia item to a user.

Various technologies pertaining to search engines and search engine graphical user interfaces in general, and advertisement-sponsored multimedia search in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates providing a user with multiple options for downloading instances of a multimedia item is illustrated. Pursuant to an example, a search engine may comprise the system 100. The system 100 includes a receiver component 102 that receives a query from a user that pertains to a multimedia item. For instance, the user may be searching for an audio track, and therefore the query may be directed towards a title of the audio track, a title of an album that includes the audio track, a name of the artist or band of the audio track, etc. In another example, the user may be searching for a video (e.g., a movie), and the query may be directed towards a title of the video, a director of the video, an actor included in the video, etc.

An output component 104, in response to receipt of the query by the receiver component 102, can output multiple choices to the user for receiving an instance of a multimedia item returned in response to the received query. In an example, the output component 104 can output hyperlinks, graphical icons, or the like that are selectable by a user, wherein a hyperlink, graphical icon, etc. may be a choice that is presented to the user that, upon selection, initiates user-obtainment of an instance of the multimedia item pertaining to the query issued by the user.

The choices output by the output component 104 can include a first choice 106 for receiving a first instance of the multimedia item 108 and a second choice 110 for receiving a second instance of the multimedia item 112. Pursuant to an example, the first instance of the multimedia item 108 may be offered to a user 114 for free (at no charge to the user). Additionally, the first instance of the multimedia item 108 may include at least one digital rights management (DRM) restriction 116. For example, the DRM restriction 116 may be a restriction on a device that can be used to access the first instance of the multimedia item 108. In another example, the DRM restriction 116 may be a restriction on a type of device that can be used to access the first instance of the multimedia item 108. Thus, the first instance of the multimedia item 108 may be restricted to a particular portable multimedia player or type of portable multimedia player. The DRM restriction 116 may also be or include a restriction on a number of times that the first instance of the multimedia item 108 may be accessed, a restricted time window wherein the user 114 can access the first instance of the multimedia item 108 (e.g., twenty four hours after obtaining the first instance of the multimedia item 108), amongst other restrictions.

The second choice 110 provided to the user 114 for receiving the second instance of the multimedia item 112 corresponds to a fee. Thus, the user 114 can obtain the second instance of the multimedia item 112 if the user 114 is willing to pay a fee to obtain such instance of the multimedia item 112. The second instance of the multimedia item 112, however, is free of DRM restrictions. The user 114 may provide payment for the second instance of the multimedia item 112 by any suitable payment mechanism, including credit card, debit card, payment from an online account, etc. In addition, the output component 104 can output a listing of search results in response to a received query, wherein the search results may include web pages, similar multimedia items, information pertaining to an artist related to the received query, etc. Still further, the output component 104 can output social networking information that may or may not pertain to a received query. The social networking information can depict music enjoyed by friends of the user, playlists of friends of the user, amongst other information pertaining to social networking.

Therefore, the user 114 may initiate a query for a desired multimedia item, and may be provided with multiple choices for obtaining an instance of such item. If the user 114 selects the first choice 106, the user 114 can obtain the first instance of the multimedia item 108 free of charge; however, the first instance of the multimedia item 108 includes one or more DRM restrictions. If the user 114 selects the second choice 110, the user 114 can obtain the second instance of the multimedia item 112 for a fee; however, the second instance of the multimedia item 112 is free of DRM restrictions. Pursuant to an example, the first instance of the multimedia item 108 may be formatted in a first data format (e.g., a proprietary data format corresponding to a particular type of portable multimedia player), while the second instance of the multimedia item 112 may be formatted in a second format (e.g., MP3, WAV, . . . ).

The system 100 additionally includes a transmitter component 118 that transmits either the first instance of the multimedia item 108 to the user 114 or the second instance of the multimedia item 112 to the user based at least in part upon receipt of a selection of one of the first choice 106 and the second choice 110 by the user 114. Thus, if the user 114 selects the first choice 106, the transmitter component 118 can transmit the first instance of the multimedia item 108 to the user (e.g., to a computing device of the user 114). Similarly, if the user 114 selects the second choice 110 (and provides payment), the transmitter component 118 can transmit the second instance of the multimedia item 112 to the user 114. While not shown, the transmitter component 118 may access the appropriate instance of the multimedia item from a server and transmit the instance of the multimedia item to the user 114 by way of the Internet or other suitable network.

The system 100 may additionally include a payment component 120 that allocates payment to an owner 124 (e.g., ASCAP, BMI, another owner of copyright rights, . . . ) of the multimedia item regardless of which of the first choice 106 or the second choice 110 is selected by the user 114. Thus, if the user 114 chooses to obtain the first instance of the multimedia item 108, the system 100 will bear the cost of such first instance of the multimedia item 108 for the user 114.

Figure 2:
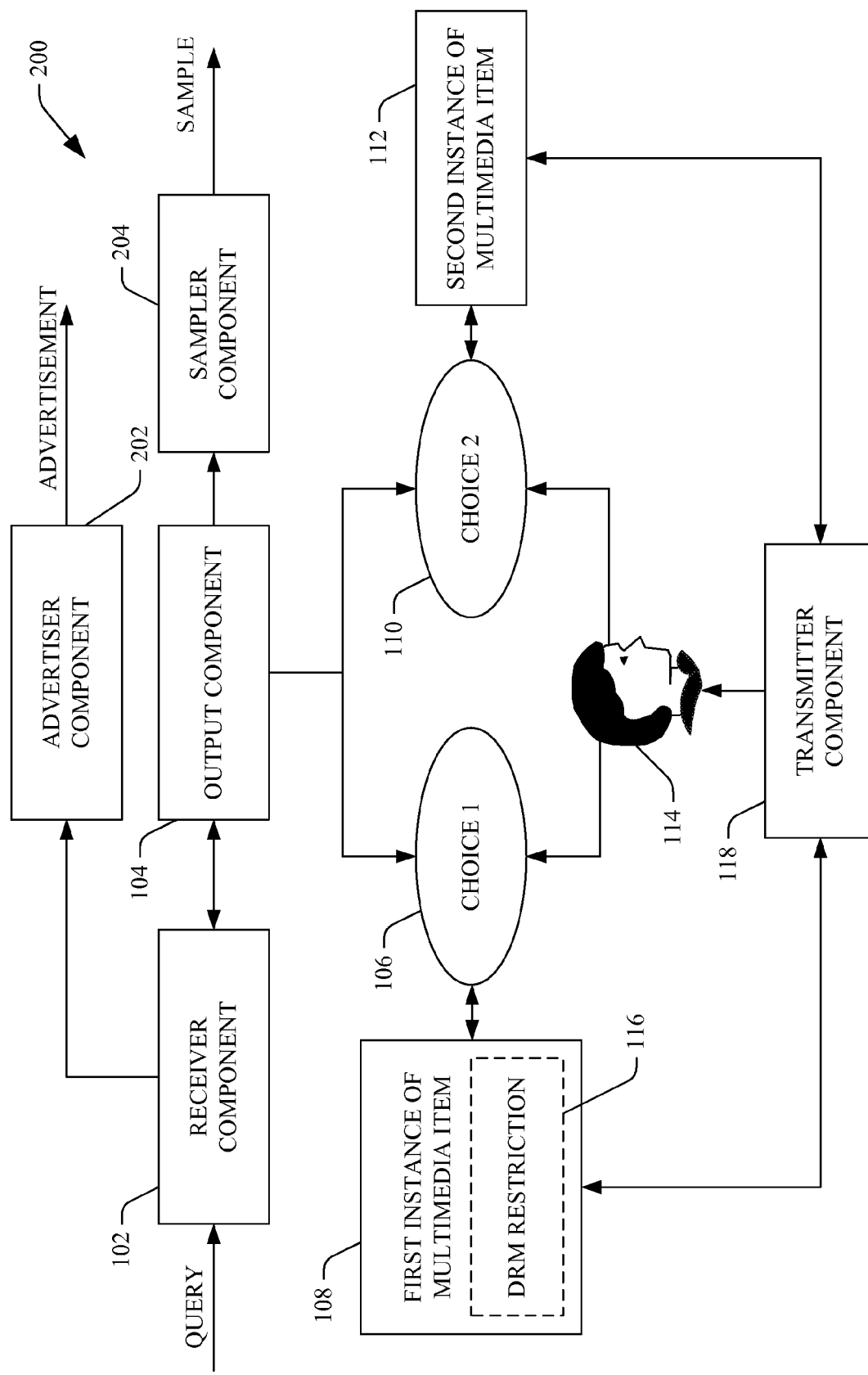
FIG. 2 is a functional block diagram of an example system that facilitates outputting an advertisement based at least in part upon a search pertaining to a multimedia item.

Referring now to FIG. 2, an example system 200 that facilitates provision of an instance of a multimedia item to a user is illustrated. The system 200 includes the receiver component 102 that receives a query that is proffered by the user 114 and pertains to a multimedia item, such as an audio track, a video, etc. The system 200 additionally includes the output component 104 that outputs multiple choices to the user, wherein the choices relate to providing an instance of the multimedia item to the user. More particularly, the output component 104 outputs at least the first choice 106 and the second choice 110, which correspond to the first instance of the multimedia item 108 and the second instance of the multimedia item 112. The user 114 can select one of the first choice 106 and the second choice 110, and the transmitter component 118 can transmit either the first instance of the multimedia item 108 and the second instance of the multimedia item 112 based at least in part upon whether the user selected the first choice 106 or the second choice 110.

The system 200 may additionally include an advertiser component 202 that can automatically serve an advertisement to the user 114 based at least in part upon the received query. For instance, the receiver component 102 may receive a query pertaining to an audio track. The advertiser component 202 may output, for instance, an advertisement for a multimedia player or other hardware associated with a multimedia player, such as a docking station, headphones, and/or the like. In another example, the advertiser component 202 may output an advertisement pertaining to upcoming concerts where the artist of the multimedia item will be performing. In still yet another example, the advertiser component 202 can output an advertisement based upon inferred or provided demographic information of the user 114. For instance, the advertiser component 202 can determine that a high probability exists that a user searching for a particular multimedia item is a teenage male. Accordingly, the advertiser component 202 can output advertisements for items typically purchased by teenage males, such as video game consoles, a particular line of clothing, etc. Still further, the advertiser component 202 may use an auction approach in connection with selling advertisements to advertisers on a per click basis, a per display basis, or any other suitable manner for generating revenue. Revenue generated by way of providing advertisements to users may be used to offset payments allocated to owners of copyright rights of multimedia items (e.g., payments output by the payment component 120 (FIG. 1)).

The system 200 may also include a sampler component 204 that can provide the user 114 with a streaming sample of the multimedia item. For example, the user 114 may wish to listen to a sample of an audio track prior to downloading an instance of such audio track. The sampler component 204 may provide the user 114 with a streaming sample of the audio track, such as a thirty second sample. Upon reviewing the sample, the user 114 may determine whether it is desirable to download the first instance of the multimedia item 108 or the second instance of the multimedia item 112.

Figure 3:
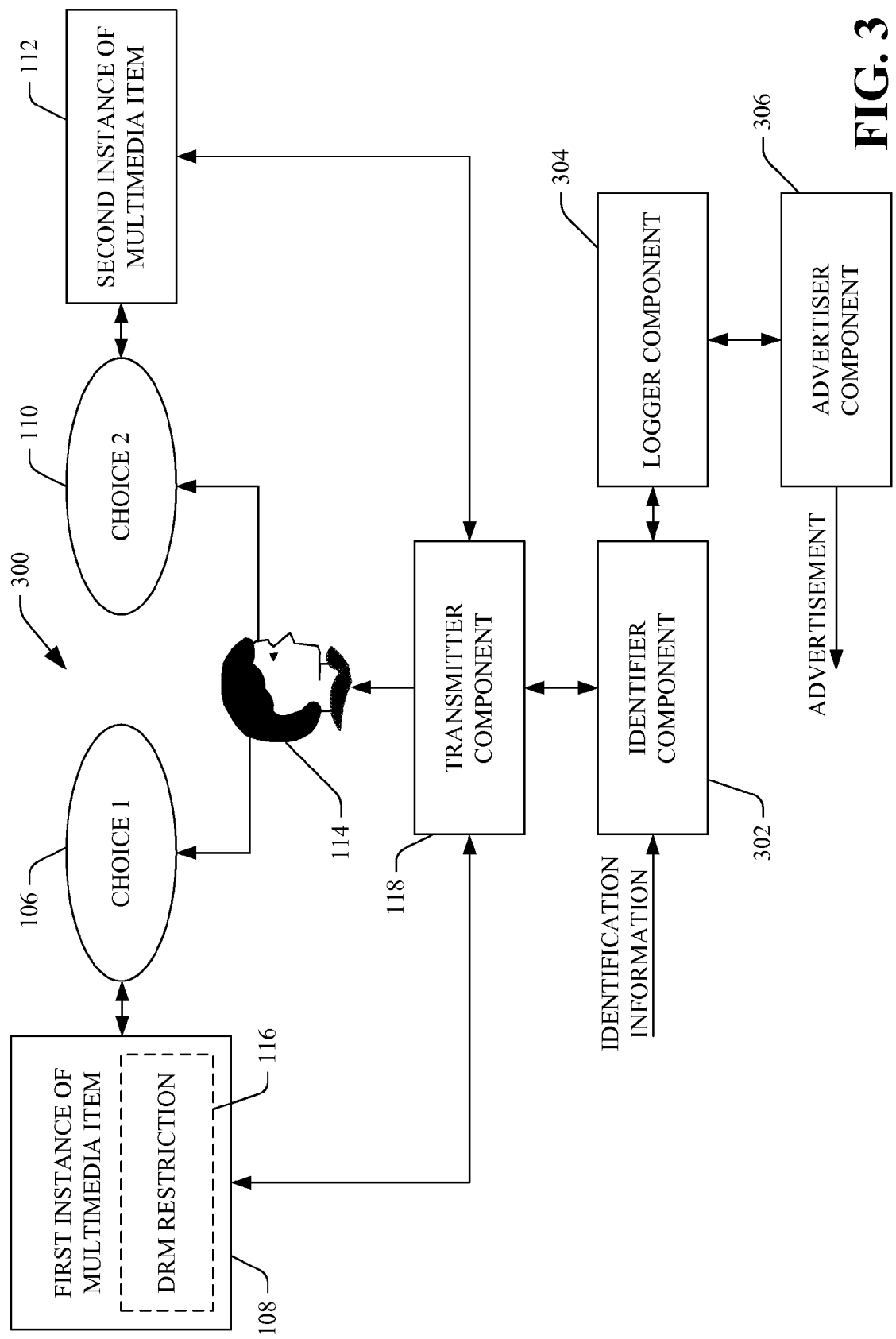
FIG. 3 is a functional block diagram of an example system that facilitates tracking online activity of a user and outputting an advertisement based at least in part thereon.

Turning now to FIG. 3, an example system 300 that facilitates transmitting an instance of a multimedia item to a user is illustrated. The system 300 includes the transmitter component 118, which can transmit either the first instance of the multimedia item 108 or the second instance of the multimedia item 112 based at least in part upon whether the user 114 selects the first choice 106 or the second choice 110. The system 300 may also include an identifier component 302 that can identify the user 114. For instance, the identifier component 302 may receive an IP address corresponding to the user 114 and may identify the user 114 based at least in part upon the received IP address. In another example, the identifier component 302 can receive a username, password, personal identification number, and/or the like, and can identify the user 114 based at least in part upon such information. In still yet another example, the identifier component 302 may receive biometric information, such as a fingerprint scan, a voice sample, and/or the like and can identify the user 114 based at least in part upon the received biometric information.

Pursuant to an example, the transmitter component 118 can restrict access to at least one of the choices 106 or 110 output by the output component 104 (FIG. 2) if the user 114 has not been identified by the identifier component 302. More particularly, the transmitter component 118 may allow the user to download the first instance of the multimedia item 108 only if the identifier component 302 has received information that can be used to identify the user 114 from such user 114 (e.g., login data). In another example, the output component 104 (FIG. 1) can output additional choices or reduce a fee corresponding to the second choice 110 if the identifier component 302 has received identifying information from the user 114. In still yet another example, the output component 104 may not output one or more of the choices 106 or 110 if the identifier component 302 has not received identifying information from the user 114. Upon the identifier component 302 receiving identifying information from the user 114 (and the identifier component 302 authenticating an identity of the user 114), the output component 104 can output the first choice 106 and the second choice 110 to the user 114.

The system 300 may also include a logger component 304 that logs online activity of the user 114 upon the user 114 being identified to create a user log. For instance, the user log generated by the logger component 304 can include queries proffered by the user 114, identities of multimedia items downloaded by the user, information pertaining to whether the user 114 typically downloads instances of multimedia items that have DRM restrictions (and are free) or typically downloads multimedia items that are free of DRM restrictions but are associated with a fee, web pages visited by the user 114, advertisements clicked on by the user 114, purchases resulting from advertisements, etc. Further, the logger component 304 can log online activity of the user 114 over multiple sessions to generate a comprehensive user log of online activity of the user 114.

The system 300 can also include an advertiser component 306 that outputs an advertisement to the user 114 based at least in part upon contents of the user log. For instance, based upon contents of the user log, the advertiser component 306 can infer demographic information of the user 114, such as sex of the user 114, age of the user 114, location of the user 114, interests of the user 114, etc. The advertiser component 306 may then provide targeted advertisements to the user 114. For example, the advertiser component 306 can determine that the user 114 has an interest in skiing, and can provide the user with advertisement pertaining to ski resorts, ski equipment, etc. (even if the query proffered by the user 114 is not germane to skiing).

Figure 4:
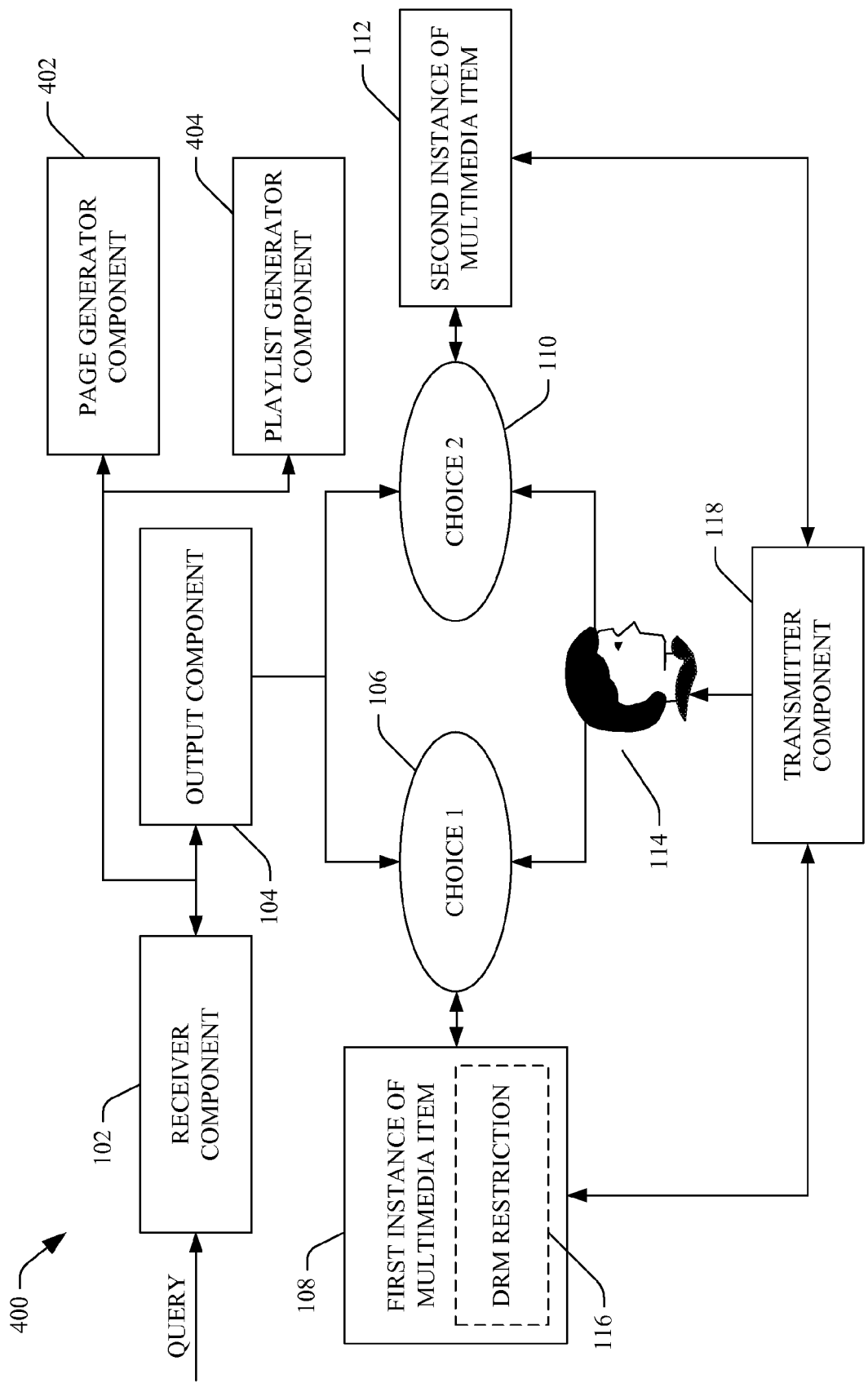
FIG. 4 is a functional block diagram of an example system that facilitates transmitting an instance of a multimedia item to a user.

Now referring to FIG. 4, an example system 400 that facilitates transmitting an instance of a multimedia item to a user is illustrated. The system 400 includes the receiver component 102 that receives a search query from the user 114 and an output component 104 that outputs the first choice 106 and the second choice 110 based at least in part upon the received query. The system 400 also includes the transmitter component 118 that transmits either the first instance of the multimedia item 108 or the second instance of the multimedia item 112 depending on whether the user 114 selected the first choice 106 or the second choice 110 (e.g., depending upon a graphical icon, hyperlink, or the like selected by the user 114).

The system 400 can also include a page generator component 402 that can display information pertaining to an artist, actor, or the like based at least in part upon the received query. For instance, the user 114 may search for a particular audio track, and the page generator component 402 can output information pertaining to the artist of the audio track. Such information may be included in a particular display field of a graphical user interface, and is referred to herein as an artist page. For instance, as will be illustrated herein, the artist page may be included as a portion of a graphical user interface that corresponds to a search engine. In another example, the page generator component 402 can generate the artist page in a separate browser window. An artist page may include albums of the artist, upcoming concerts of the artist, photos of the artist, information pertaining to upcoming album releases, and other information.

The system 400 can also include a playlist generator component 404 that can output a playlist to the user 114, wherein the playlist may include audio tracks and/or videos downloaded by the user 114 by way of the system 400, may include audio tracks and/or videos resident upon a personal computer of the user 114, may include audio tracks and/or videos recommended to the user 114, etc. In another example, the playlist generator component 404 can output a playlist that includes multimedia items that related to the multimedia item pertaining to the query, such as multimedia items that are in a substantially similar genre as the multimedia item pertaining to the query, multimedia items that are by the same artist as the multimedia item pertaining to the query, etc. Moreover, the playlist generator component 404 can output a playlist to the user 114 that is a playlist of another user who has similar interests to the user 114, who is in a similar geographic location of the user 114, who is of a similar age to the user 114, etc.

With reference now to FIGS. 5-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 5:
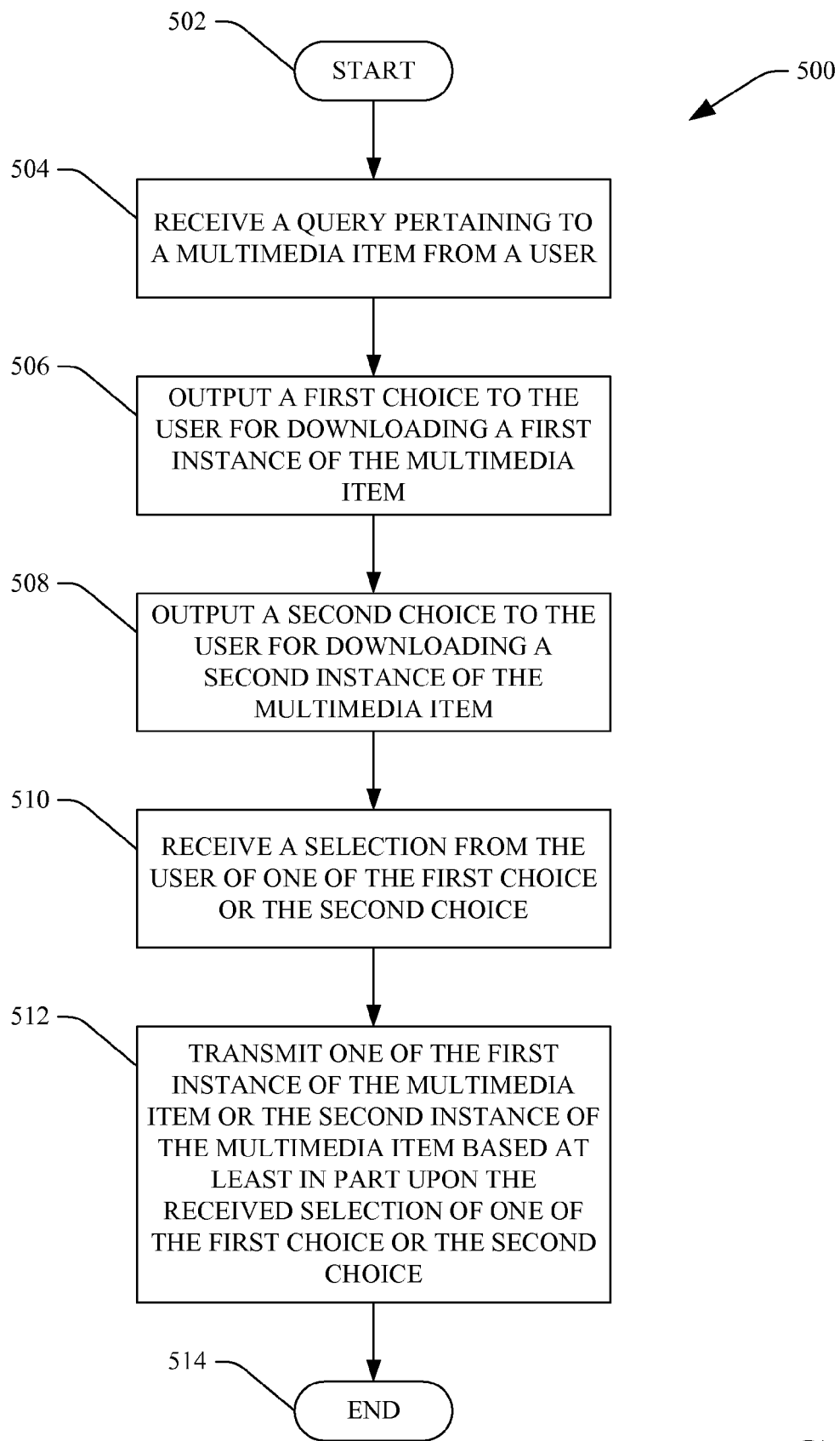
FIG. 5 is a flow diagram that illustrates an example methodology for transmitting an instance of a multimedia item to a user.

Referring specifically to FIG. 5, an example methodology 500 for transmitting an instance of a multimedia item to a user is illustrated. The methodology 500 starts at 502, and at 504 a query pertaining to a multimedia item is received from a user. The query may include keywords pertaining to a title of the multimedia item, an artist of the multimedia item, a title of an album that includes the multimedia item, etc.

At 506, a first choice is output to the user for downloading a first instance of the multimedia item. Pursuant to an example, the choice may be presented to the user as a hyperlink, a selectable graphical icon, etc. Further, the first instance of the multimedia item can include one or more DRM restrictions. Moreover, downloading of the first instance of the multimedia item may be free to the user.

At 508, a second choice is output to the user for downloading a second instance of the multimedia item. The second instance of the multimedia item may be free of DRM restrictions; however, the user may have charged with a fee if the user selects the second choice.

At 510, a selection of one of the first choice or the second choice is received from the user. For example, the user may select a hyperlink or graphical icon corresponding to one of the first choice or the second choice. For instance, the received selection from the user can be the first choice, the user may be requested to provide login information prior to transmitting a corresponding first instance of the multimedia item to the user.

At 512, one of the first instance of the multimedia item or the second instance of the multimedia item is transmitted based at least in part upon the received selection of one of the first choice or the second choice. The one of the first instance or the second instance of the multimedia item can be transferred to a client computer operated by the user. The methodology 500 completes at 514.

Figure 6:
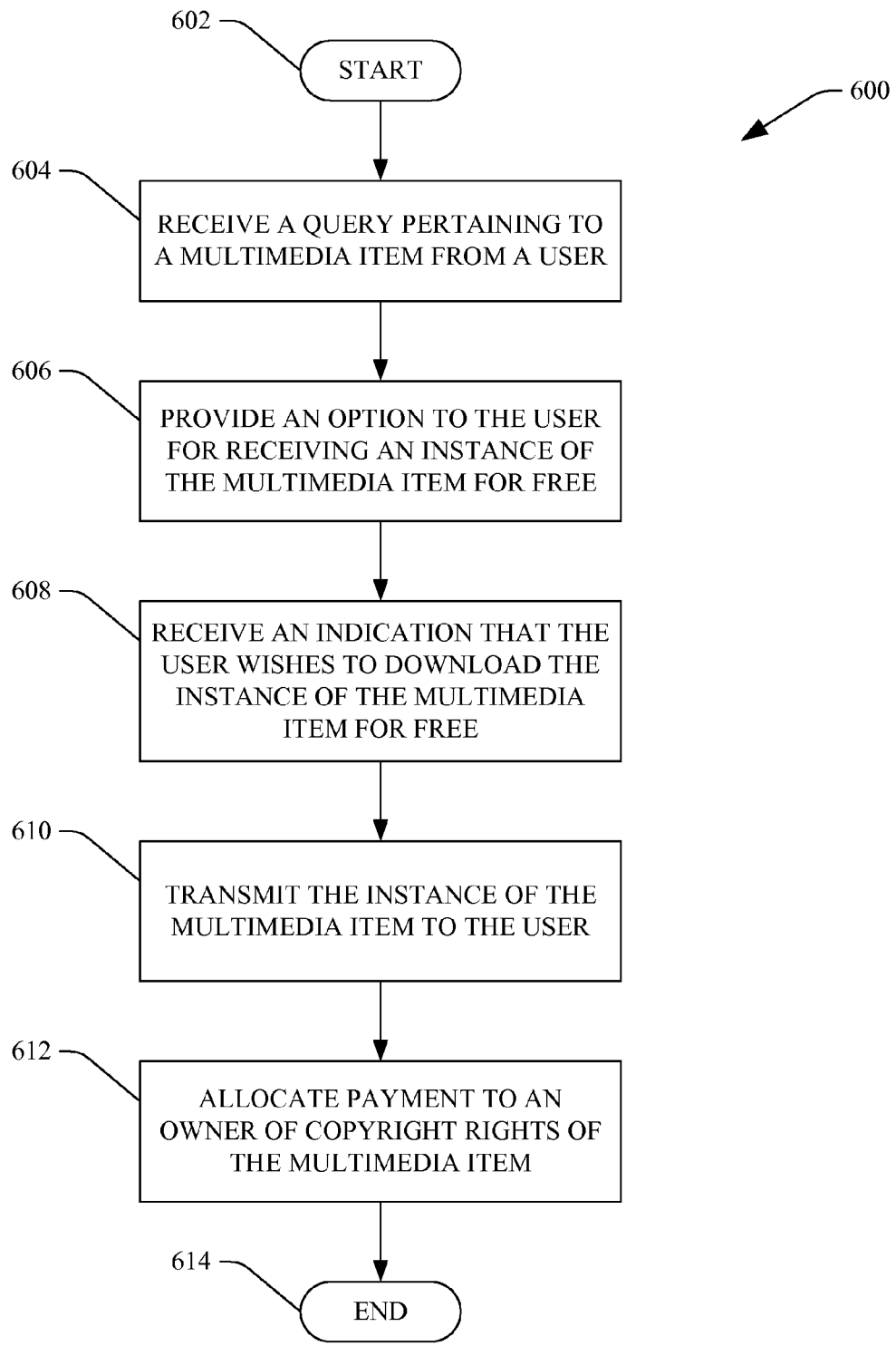
FIG. 6 is a flow diagram that illustrates an example methodology for allocating payment to an owner of copyright rights of a downloaded instance of a multimedia item.

Now referring to FIG. 6, an example methodology 600 for transmitting an instance of a multimedia item to a user is illustrated. The methodology 600 starts at 602, and at 604 a query pertaining to a multimedia item is received from a user. At 606, an option is provided to the user to receive an instance of the multimedia item for free.

At 608, an indication is received that the user wishes to download the instance of the multimedia item for free. For example, the user may select a hyperlink or graphical icon that initiates the download.

At 610, the instance of the multimedia item is transmitted to the user. For example, the instance can be transmitted from a server to a client that is operated by the user. At 612, payment is allocated to an owner of copyright rights of the multimedia item. For example, upon the instance of the multimedia item being downloaded, monies can be transferred to an account that corresponds to the owner of copyright rights of the multimedia item. In another example, monies can be held and then transferred to an account that corresponds to the owner of the copyright rights at a particular time (e.g., monthly payments). The methodology 600 completes at 614.

Figure 7:
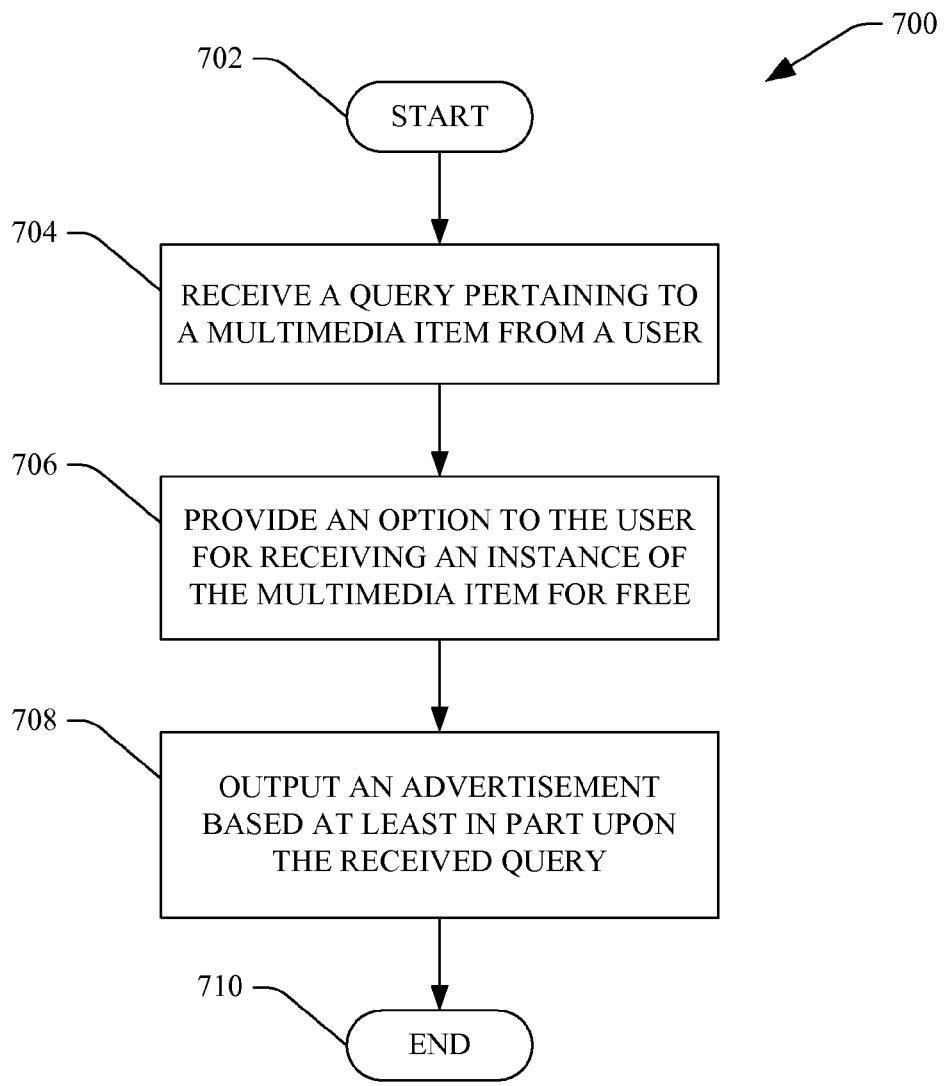
FIG. 7 is a flow diagram that illustrates an example methodology for outputting an advertisement based at least in part upon a received query pertaining to a multimedia item.

Turning now to FIG. 7, an example methodology 700 for outputting an advertisement is illustrated. The methodology 700 starts at 702, and at 704 a query pertaining to a multimedia item is received from a user. At 706, an option is provided to the user for receiving an instance of the multimedia item for free. At 708, an advertisement is output based at least in part upon the received query. Monies generated from advertising revenue can be used to offset expenses corresponding to providing the instance of the multimedia item for free. The methodology 700 completes at 710.

Figure 8:
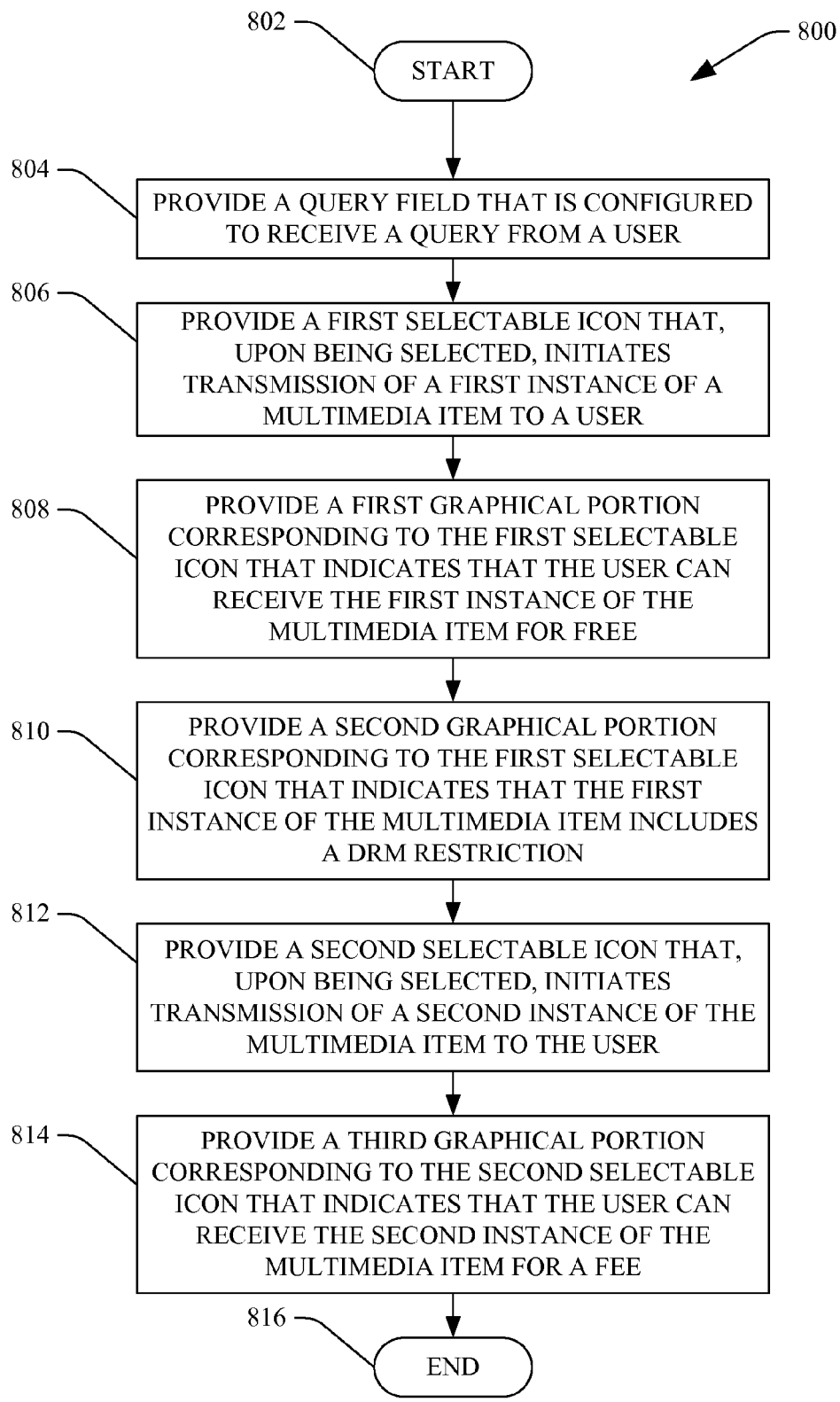
FIG. 8 is a flow diagram that illustrates an example methodology for providing a graphical user interface to a user.

Now referring to FIG. 8, a methodology 800 for providing a graphical user interface to a user is illustrated. The methodology 800 begins at 802, and at 804 a query field is provided that is configured to receive a query from the user. At 806, a first selectable icon is provided, wherein the first selectable icon, upon being selected, can initiate transmission of a first instance of a multimedia item to a user. For instance, the first selectable icon may be text, graphics, or a combination thereof.

At 808, a first graphical portion corresponding to the first selectable icon is provided. The first graphical portion, for instance, may indicate that the user can receive the first instance of the multimedia item for free. The first graphical portion may be or include text, graphics, or some combination thereof. At 810, a second graphical portion that corresponds to the first selectable icon is provided. The second graphical portion may indicate that the first instance of the multimedia item includes a DRM restriction. For example, the second graphical portion may indicate that the first instance of the multimedia item may only be accessed on a particular type of device.

At 812, a second selectable icon is provided, wherein selection of the second selectable icon can initiate transmission of a second instance of the multimedia item to the user. At 814, a third graphical portion that corresponds to the second selectable icon is provided, wherein the third graphical portion indicates that the user can receive the second instance of the multimedia item for a fee. For example, the third graphical portion may be text, graphics, or some suitable combination thereof. The methodology 800 completes at 816.

Figure 9:
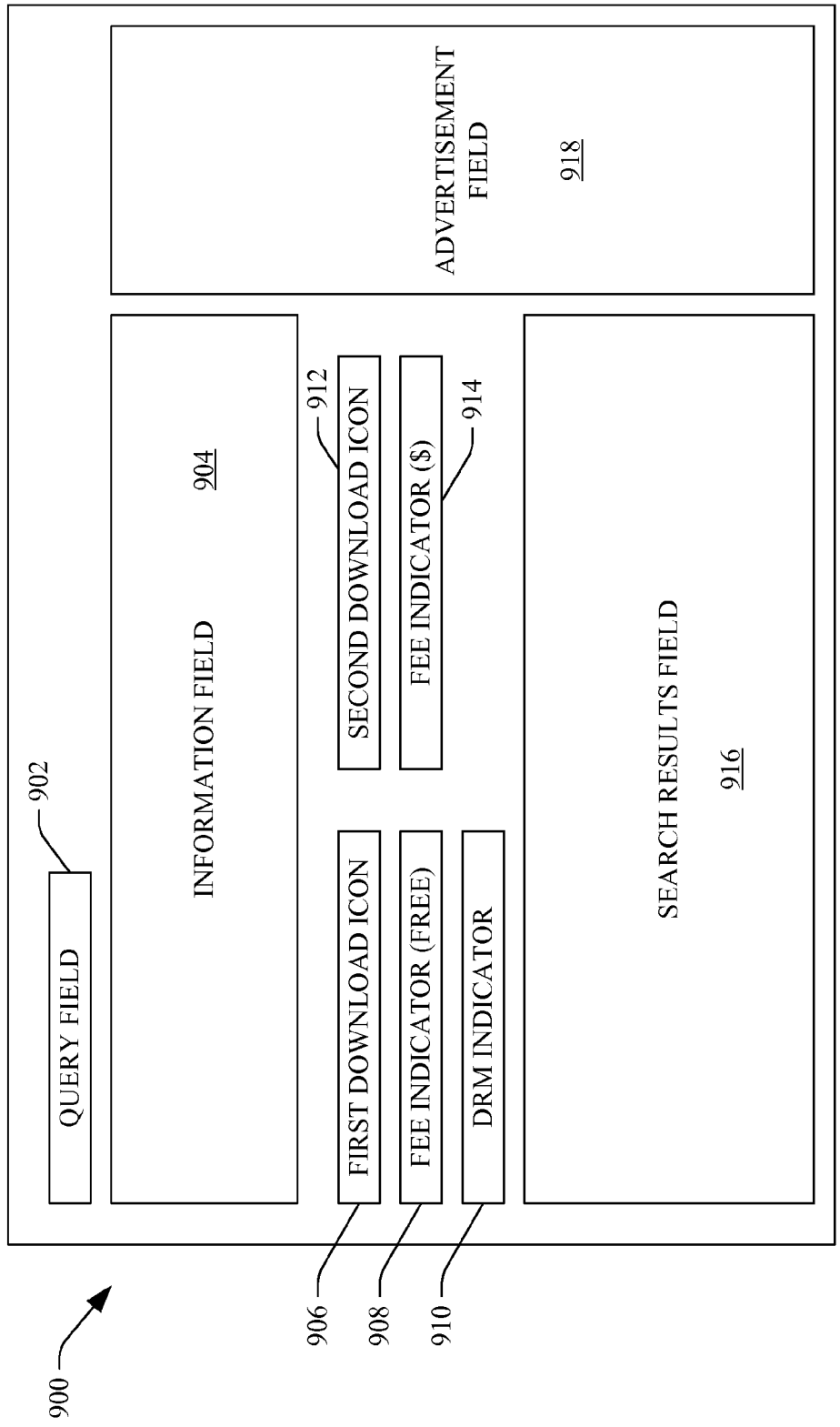
FIGS. 9-11 are example graphical user interfaces.
Figure 10:
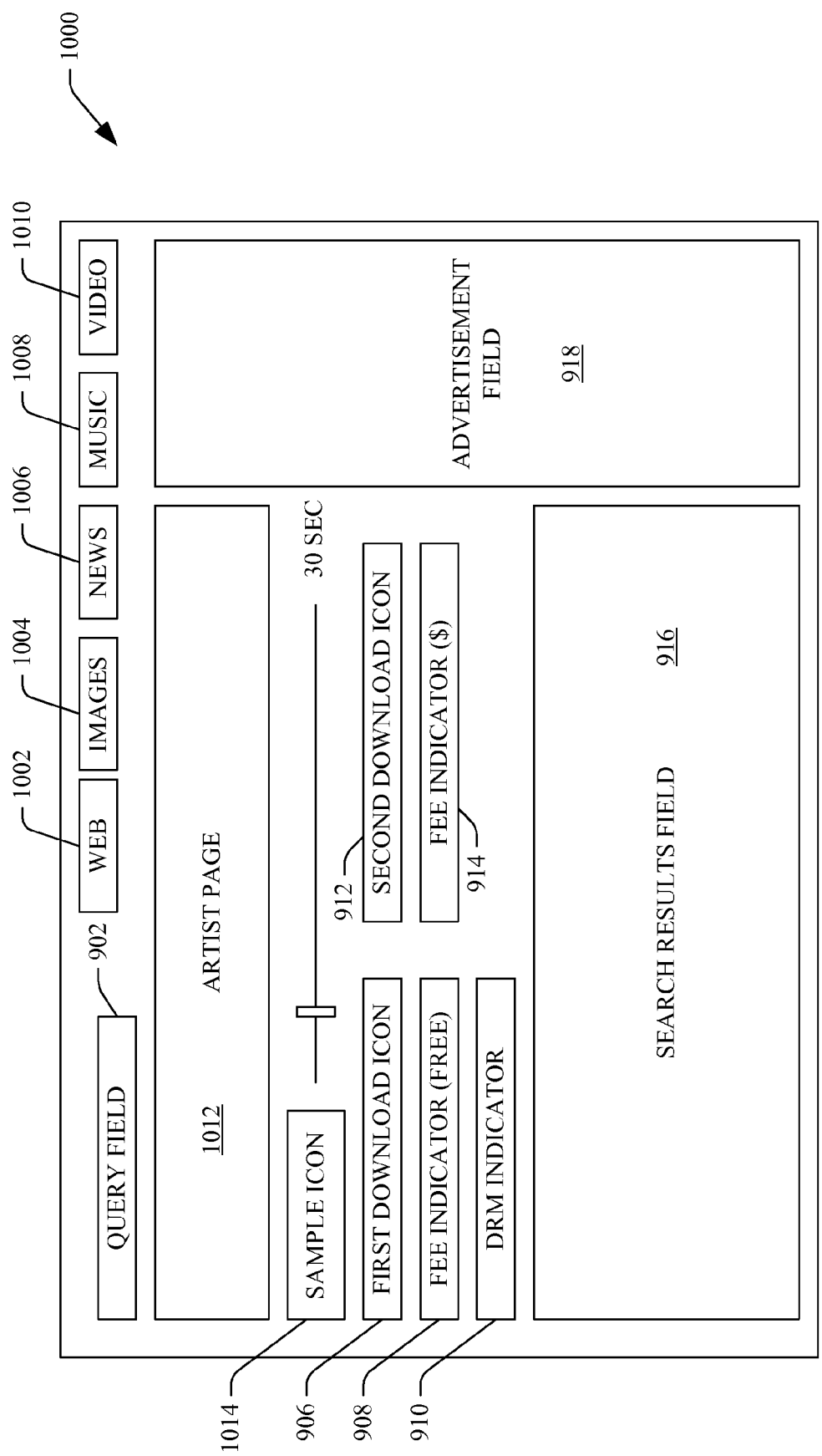
Figure 11:
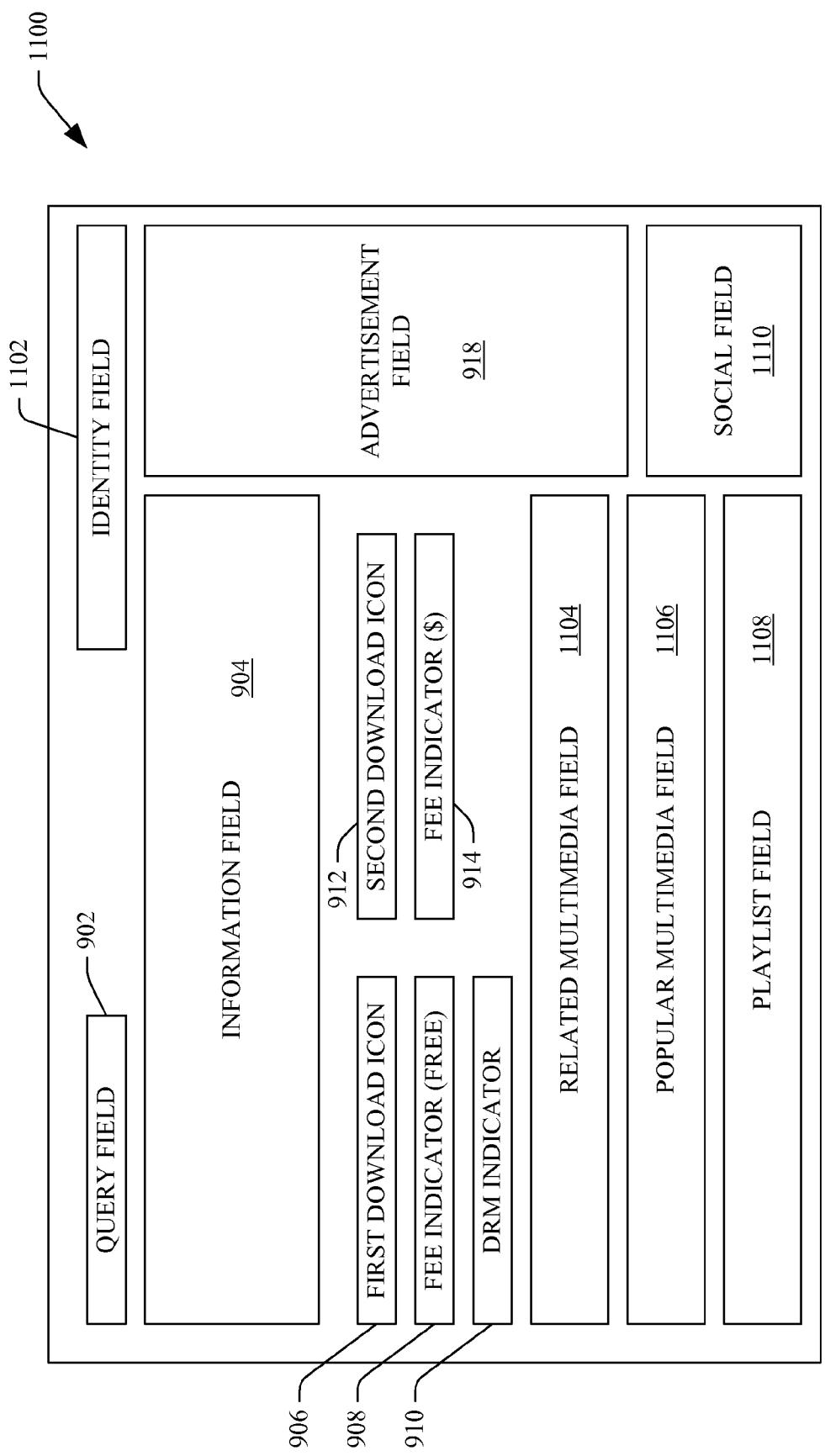

Now collectively to FIGS. 9-11, various example graphical user interfaces that can be used in connection with a search engine are depicted. The graphical user interfaces are depicted as including particular fields and/or graphical icons. It is to be understood, however, that a graphical user interface may include combinations of fields and/or graphical portions that are presented in FIGS. 9-11. Furthermore, not all fields and/or graphical portions depicted in an example graphical user interface depicted herein may be necessary to fall within the scope of the hereto-appended claims.

Now referring specifically to FIG. 9, an example graphical user interface 900 is illustrated. The graphical user interface 900 includes a query field 902 that can be configured to receive a query from a user. The graphical user interface 900 also includes an information field 904 that depicts information related to the query to the user. For example, the information field 904 may be configured to depict information relating to an artist that pertains to the query. Such information can comprise biographical information of the artist, albums of the artist, upcoming concert schedule of the artist, etc. In another example, the information field 904 can display information pertaining to a multimedia item related to the query.

The graphical user interface 900 can also include a first download icon 906, wherein selection of the first download icon 906 can initiate transmission of a first instance of a multimedia item that pertains to the query to the user. The first download icon 906 may include text, graphics, or a combination thereof. The graphical user interface 900 can also include a first fee indicator portion 908, wherein the first fee indicator portion 908 can indicate that the first instance of the multimedia item can be obtained by the user without charge. The fee indicator portion 908 may comprise text, graphics, or a combination thereof.

The graphical user interface 900 may also include a DRM indicator portion 910 that corresponds to the first download icon 906. The DRM indicator portion 910 can indicate a type of DRM restriction that corresponds to the first instance of the multimedia item. For instance, the DRM indicator portion 910 may indicate that a particular type of device must be used to access the first instance of the multimedia item. The DRM indicator portion 910 may comprise text, graphics, or some suitable combination thereof.

The graphical user interface 900 may further comprise a second download icon 912, wherein selection of the second download item may initiate transmission of a second instance of the multimedia item to the user. The second download icon 912 may comprise text, graphics, or a combination thereof.

A second fee indictor portion 914 can be included in the graphical user interface 900, wherein the second fee indicator portion 914 can indicate a particular fee that corresponds to the second instance of the multimedia item. The second fee indicator portion 914 may comprise text, graphics, or some combination thereof.

The graphical user interface 900 may additionally include a search results field 916 that can be configured to depict search results pertaining to the query. For instance, the search results field 916 may include links to web pages that pertain to the received query. Furthermore, the graphical user interface 900 may include an advertisement field 918 that is configured to display advertisements, wherein a displayed advertisement may be based at least in part upon the received query. In another example, an advertisement displayed in the advertisement field may be targeted to the user based upon previous online activities of the user.

Now referring to FIG. 10, an example graphical user interface 1000 is depicted. The graphical user interface 1000 includes the query field 902, the first download icon 906, the first fee indicator portion 908, the DRM indicator portion 910, the second download icon 912, the second fee indicator portion 914, the search results field 916, and the advertisement field 918. Additionally, the graphical user interface 1000 can include a plurality of selectable icons 1002-1010 that can be used to filter a data set that can be searched over when a query is received. For instance, a web icon 1002 can be selected if the user wishes to perform a traditional web search. In another example, an images icon 1004 can be selected if the user wishes to search for images. In yet another example, a news icon 1006 can be selected if the user wishes to search for a particular news item. In still yet another example, a music icon 1008 can be selected if the user wishes to search for music (e.g., downloadable music). In another example, a video icon 1010 can be selected if the user wishes to search for video items.

The graphical user interface 1000 may additionally include an artist page 1012 that can depict a page that depicts information about an artist that pertains to a received query. For instance, a user may select the music icon 1008, and may proffer a query pertaining to a particular multimedia item. The artist page 1012 may display information relating to the artist, including biographical information, information relating to upcoming concerts, other songs by the artist, etc.

The graphical user interface 1000 may also include a sample icon 1014 that, when selected, can initiate streaming of the multimedia item to the user. For instance, a thirty second sample of the multimedia item may be streamed to the user upon selection of the sample icon 1014.

With reference to FIG. 11, an example graphical user interface 1100 is depicted. The graphical user interface 1100 includes the query field 902, the information field 904, the first download icon 906, the first fee indicator portion 908, the DRM indicator portion 910, the second download icon 912, the second fee indicator portion 914, the search results field 916, and the advertisement field 918.

The graphical user interface 1100 additionally includes an identity field 1102 that can depict an identity of the user (e.g., after the user has signed in) or request that the user provide identifying information. For instance, the identity field 1102 can be configured to receive a username, a password, a personal identification number, and/or the like. In an example, prior to being provided with the first download icon 906, the user can be requested to provide identifying information.

The graphical user interface 1100 may also include a related multimedia field 1104 that depicts multimedia items that are related to the multimedia item that pertains to a received query. For instance, the related multimedia field 1104 can depict multimedia items in a substantially similar genre as the multimedia item that pertains to the received query.

The graphical user interface 1100 can also comprise a popular multimedia field 1106 that can depict most popular multimedia items to the user. In an example, the popular multimedia field 1106 can depict a threshold number of multimedia items that have been most downloaded by users. A playlist field 1108 can depict one or more playlists that can be selected by the user. For instance, the playlist field 1108 can depict a playlist of another user. Furthermore, the graphical user interface 1100 may comprise a social field 1110 that depicts social networking information. For example, the social field 1110 may depict multimedia items that have been downloaded by friends of the user. In another example, the social field 1110 may illustrate playlists of friends of the user.

Figure 12:
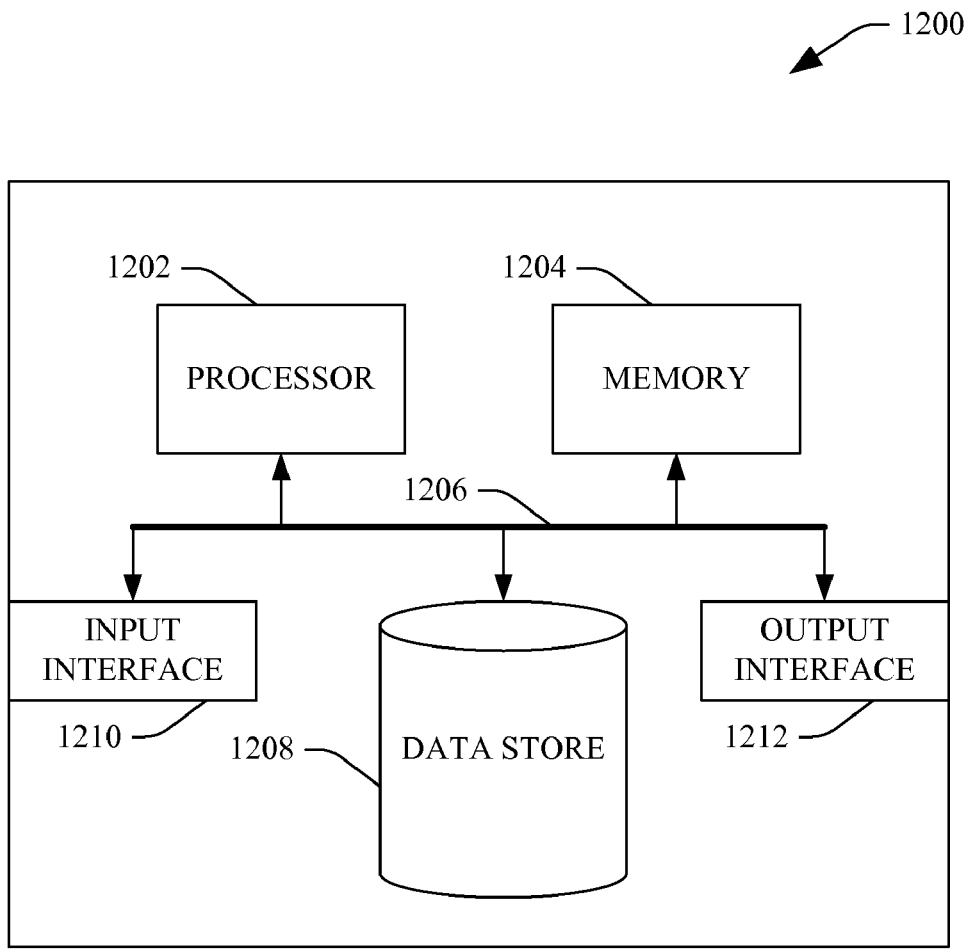
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in a system that can be used in connection with providing a user with choices pertaining to downloading instances of a multimedia item. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory by way of a system bus 1206. In addition to storing executable instructions, the memory 1204 may also store graphical icons, instances of multimedia items, DRM restrictions, etc.

The computing device 1200 additionally includes a data store 1208 that is accessible by the processor 1202 by way of the system bus 1206. The data store 1208 may include executable instructions, instances of multimedia items, advertisements, etc. The computing device 1200 also includes an input interface 1210 that allows external devices to communicate with the computing device 1200. For instance, the input interface 1210 may be used to receive instructions from an external computer device, a query, receive a selection of a choice, etc. The computing device 1200 also includes an output interface 1212 that interfaces the computing device 1200 with one or more external devices. For example, the computing device 1200 may transmit an instance of a multimedia item by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that comprises a processor and memory, wherein the memory comprises a plurality of components that are executable by the processor, the plurality of components comprising:
    a search engine, the search engine comprising:
        a receiver component that receives a query from a user that pertains to a multimedia item;
        an output component that outputs to the user multiple choices for receiving an instance of the multimedia item, the multiple choices comprising:
            a first choice for receiving a first instance of the multimedia item at no charge to the user, wherein the first instance of the multimedia item includes at least one digital rights management restriction, wherein the at least one digital rights management restriction restricts at least one of a device that is able to access the first instance of the multimedia item, a type of device that is able to access the first instance of the multimedia item, a number of times that the first instance of the multimedia item is accessible, or a window of time that the first instance of the multimedia item is accessible; and
            a second choice for receiving a second instance of the multimedia item for a fee, wherein the second instance of the multimedia item is free of the at least one digital rights management restriction;
        a transmitter component that transmits one of the first instance of the multimedia item or the second instance of the multimedia item to the user based at least in part upon receipt of a selection from the user of one of the first choice or the second choice; and
        a payment component that allocates payment to an owner of copyright in the multimedia item regardless of which of the first choice or the second choice is selected by the user.

2. The system of claim 1, wherein the plurality of components further comprise an advertiser component that automatically generates an advertisement and serves the advertisement to the user based at least in part upon the received query.

3. The system of claim 1, wherein the plurality of components further comprise comprising a results output component that displays search results other than the multimedia item to the user in response to the query.

4. The system of claim 1, wherein the multimedia item is one of an audio item or a video item.

5. The system of claim 1, wherein the plurality of components further comprising a sampler component that provides the user with a streaming sample of the multimedia item.

6. The system of claim 1, wherein the plurality of components further comprise an identifier component that receives a user identification from the user, wherein the transmitter component transmits the first instance of the multimedia item to the user only if the identifier component has received the user identification from the user.

7. The system of claim 6, wherein the plurality of components further comprising:
    a logger component that logs online activities of the user to create a user log; and
    an advertiser component that outputs an advertisement to the user based at least in part upon contents of the user log.

8. The system of claim 1, wherein the plurality of components further comprise a page generator component that provides the user with a web page pertaining to an artist that corresponds to the multimedia item.

9. The system of claim 1, wherein the output component outputs information pertaining to a plurality of multimedia items based at least in part upon the received query.

10. The system of claim 1, wherein the first instance of the multimedia item is in a first data format and the second instance of the multimedia item is in a second data format that is different from the first data format.

11. The system of claim 1, wherein the plurality of components further comprise a playlist generator component that outputs a playlist of another user.

12. A method for presenting multimedia content to a user comprising the following computer-executable acts:
    causing a processor to receive a query from the user directed towards a search engine, wherein the query pertains to a multimedia item;
    causing the search engine to output a first choice to the user for downloading a first instance of the multimedia item, wherein the first instance includes at least one digital rights management restriction, wherein the at least one digital rights management restriction restricts at least one of a device that is able to access the first instance of the multimedia item, a type of device that is able to access the first instance of the multimedia item, a number of times that the first instance of the multimedia item is accessible, or a window of time that the first instance of the multimedia item is accessible, and wherein downloading the first instance of the multimedia item is free to the user;
    causing the search engine to output a second choice to the user for downloading a second instance of the multimedia item, wherein the second instance is free of the at least one digital rights management restrictions, and wherein a fee is charged to the user if the user selects the second choice;
    receiving a selection from the user of one of the first choice or the second choice;
    causing the search engine to transmit one of the first instance of the multimedia item or the second instance of the multimedia item to the user based at least in part upon the received selection of one of the first choice or the second choice; and causing the search engine to transmit payment to an owner of copyright in the multimedia item regardless of whether the user selected the first choice or the second choice.

13. The method of claim 12, wherein the received selection from the user is the first choice, and further comprising requesting the user to provide login information prior to transmitting the first instance of the multimedia item to the user.

14. The method of claim 12, further comprising causing the search engine to output an advertisement pertaining to music hardware to the user based at least in part upon the received query.

15. The method of claim 12, further comprising receiving an indication from the user that the user wishes to search for multimedia items prior to receiving the query from the user.

16. The method of claim 12, further comprising:
  receiving an indication that the user desires to review the multimedia item prior to downloading the multimedia item; and
  streaming a sample of the multimedia item to the user.

17. The method of claim 12, further comprising presenting to the user a list of other multimedia items that are available for download.

18. A memory comprising instructions that, when executed by a processor, cause the processor to perform acts comprising:
  presenting a user with a plurality of choices pertaining to a multimedia item retrieved by a search engine responsive to a query submitted to the search engine by the user, wherein the plurality of choices comprise:
    a first choice for downloading a first instance of the multimedia item, wherein the first instance of the multimedia item has at least one digital rights management restriction that restricts access to the first instance of the multimedia item to a predefined device; and
    a second choice for downloading a second instance of the multimedia item, wherein the second instance of the multimedia item is free of the at least one digital rights management restriction;
  if the user selects the first choice, transmitting the first instance of the multimedia item to a computer operated by the user at no charge to the user;
  if the user selects the second choice, transmitting the second instance of the multimedia item to a computer operated by the user subsequent to receiving payment from the user for the second instance of the multimedia item; and
  causing the search engine to transmit payment to a copyright holder in the multimedia item regardless of whether the user selected the first choice or the second choice.

19. The system of claim 1, wherein the first choice and the second choice are displayed to the user as selectable hyperlinks on a web page.

20. The method of claim 12, further comprising presenting an artist page to the user subsequent to receiving the query, wherein the artist page comprises albums created by an artist of the multimedia item, upcoming concerts of the artist, and photographs of the artist, and wherein the first choice and the second choice are displayed on the artist page.

* * * * *